(12) United States Patent
Imaizumi et al.

(10) Patent No.: US 6,963,665 B1
(45) Date of Patent: Nov. 8, 2005

(54) METHOD AND APPARATUS FOR DETERMINING FORM SHEET TYPE

(75) Inventors: Atsuhiro Imaizumi, Owariasahi (JP); Masato Teramoto, Nagoya (JP); Tsukasa Yasue, Nagakute (JP)

(73) Assignee: Hitachi, Ltd., Tokyo (JP)

( * ) Notice: Subject to any disclaimer, the term of this patent is extended or adjusted under 35 U.S.C. 154(b) by 699 days.

(21) Appl. No.: 09/645,404

(22) Filed: Aug. 25, 2000

(30) Foreign Application Priority Data

Jan. 18, 2000 (JP) .............................. 2000-009165

(51) Int. Cl.$^7$ ............................................ G06K 9/62
(52) U.S. Cl. ..................................... 382/181; 382/229
(58) Field of Search ............................... 382/181, 305, 382/229, 224, 306, 209, 217, 218

(56) References Cited

U.S. PATENT DOCUMENTS

| | | | | |
|---|---|---|---|---|
| 4,985,863 A | * | 1/1991 | Fujisawa et al. ............... | 707/5 |
| 5,235,653 A | * | 8/1993 | Nakano et al. ............. | 382/175 |
| 5,821,929 A | * | 10/1998 | Shimizu et al. ............. | 382/190 |
| 6,263,121 B1 | * | 7/2001 | Melen et al. ................ | 382/305 |
| 6,363,179 B1 | * | 3/2002 | Evans et al. ................ | 382/309 |
| 6,505,195 B1 | * | 1/2003 | Ikeda et al. ..................... | 707/3 |

FOREIGN PATENT DOCUMENTS

| | | |
|---|---|---|
| EP | 0 616 296 | 9/1994 |
| EP | 0 809 219 | 11/1997 |
| JP | 7-273922 | 10/1995 |
| JP | 9-330363 | 12/1997 |

OTHER PUBLICATIONS

Amano. "DRS: A Workstation-Based Document Recognition System for Text Entry." Computer, vol. 25, No. 7, Jul. 1992, pp. 67-71.*
Kreich. "Robust Recognition of Documents." Proc. 2nd Int. Conf. on Document Analysis and Recognition, Oct. 20, 1993, pp. 444-447.*
P. Herrmann et al, "Retrieval of Document Images Using Layout Knowledge", IEEE Comp. Soc., 1993, pp. 537-540.
M. Junker et al, "Evaluating OCR and Non-OCR Text Representations for Learning Document Classifiers", IEEE Comp. Soc., vol. II, 1997, pp. 1060-1066.
Tun-Wen Pai et al, "An Intelligent Chinese Official Document Processing System", IEEE Comp. Soc., 1995, pp. 974-977.

* cited by examiner

*Primary Examiner*—Jon Chang
(74) *Attorney, Agent, or Firm*—Mattingly, Stanger, Malur & Brundidge, P.C.

(57) ABSTRACT

A form sheet type determining method and apparatus for determining to which of predetermined form sheets an input form sheet corresponds. A plurality of sets of keywords are registered in a keyword register with one set of keywords for each predetermined form sheet type; image data of an input form sheet is read, character strings are extracted from the read image data, and character recognition is performed on each extracted character string; each of the character recognized strings is extracted as a keyword; the extracted keywords are collated, for each form sheet type, with the sets of keywords registered in the keyword register, thereby to determine the type of the input form sheet.

22 Claims, 8 Drawing Sheets

FIG. 2A

FORM SHEET 1

| AUTOMATIC PAYMENT UTILIZATION APPLICATION BLANK (BANK COPY) | | | | | | | | | |
|---|---|---|---|---|---|---|---|---|---|
| SUBSCRIBER'S NAME | | | | | | | | | |
| RESIDENCE | | | | | | | | | |
| ACCOUNT NUMBER | 1 | 2 | 3 | 4 | 5 | 6 | 7 | 8 | |
| | | | | | | | △○BANK | | |

| FORM SHEET 1 | |
|---|---|
| KEYWORD | WEIGHT OF KEYWORD |
| AUTOMATIC PAYMENT UTILIZATION APPLICATION BLANK | 5 |
| BANK COPY | 1 |
| ACCOUNT NUMBER | 3 |
| △○BANK | 3 |

FIG. 2B

FORM SHEET 2

| ORDINARY DEPOSIT PAYING-IN SLIP | |
|---|---|
| SUBSCRIBER'S NAME | |
| AMOUNT OF MONEY | |
| | |
| ACCOUNT NUMBER | |
| | ○×BANK |

| FORM SHEET 2 | |
|---|---|
| KEYWORD | WEIGHT OF KEYWORD |
| ORDINARY DEPOSIT PAYING-IN SLIP | 5 |
| ○×BANK | 3 |
| ACCOUNT NUMBER | 3 |
| AMOUNT OF MONEY | 1 |

FIG. 2C

FORM SHEET 3

| ELECTRIC CHARGE △○BANK ××BRANCH | |
|---|---|
| ACCOUNT NUMBER | |
| ELECTRIC CHARGE | |
| SUBSCRIBER'S NAME | |

| FORM SHEET 3 | |
|---|---|
| KEYWORD | WEIGHT OF KEYWORD |
| ELECTRIC CHARGE | 5 |
| ACCOUNT NUMBER | 3 |
| △○BANK | 3 |
| | |

FIG. 3

```
┌─────────────────────────────────┐ ⟵ 31
│  * APPLICATION BLANK            │
│  * CHARGE                       │
│  * BANK                         │
│  * TAX                          │
│    NAME                         │
│    CONFIRMATION SEAL            │
│    ACCOUNT NUMBER               │
│    BANK COPY                    │
│  :                              │
│  :                              │
└─────────────────────────────────┘
```

FIG. 4

WEIGHT OF KEYWORD ACCORDING TO LOCATION OF DESCRIPTION IN FORM SHEET

| | AUTOMATIC PAYMENT UTILIZATION APPLICATION BLANK (BANK COPY) | | |
|---|---|---|---|
| SUBSCRIBER'S NAME | ○ (NAME) | | |
| RESIDENCE | ○ (ADDRESS) 1-2-3 | | |
| ACCOUNT NUMBER | 1 2 3 4 5 6 7 8 | | |
| | | | △○BANK |

INPUT FORM SHEET 10, 9, 8, 7, 6, 5, 4, 3, 2, 1

| CHARACTER STRING | WEIGHT OF CHARACTER TYPE | WEIGHT OF LOCATION |
|---|---|---|
| AUTOMATIC PAYMENT UTILIZATION APPLICATION BLANK | 1 | 9 |
| BANK COPY | 1 | 9 |
| SUBSCRIBER'S NAME | 1 | 7 |
| ○ (SURNAME) | 0 | 7 |
| ○ (GIVEN NAME) | 0 | 7 |
| RESIDENCE | 1 | 6 |
| ○ (ADDRESS) | 0 | 6 |
| 1-2-3 | 0 | 5 |
| ACCOUNT NUMBER | 1 | 3 |
| 1 2 3 4 5 6 7 8 | 0 | 3 |
| △○BANK | 1 | 1 |

FIG. 5

| CHARACTER STRING | WEIGHT OF CHARACTER TYPE | WEIGHT OF LOCATION | FORM SHEET 1 WEIGHT OF KEYWORD | FORM SHEET 2 WEIGHT OF KEYWORD | FORM SHEET 3 WEIGHT OF KEYWORD |
|---|---|---|---|---|---|
| AUTOMATIC PAYMENT UTILIZATION APPLICATION BLANK | 1 | 9 | 5 | | |
| BANK COPY | 1 | 9 | 1 | | |
| SUBSCRIBER'S NAME | 1 | 7 | | | |
| ○ (SURNAME) | 0 | 7 | | | |
| ○ (GIVEN NAME) | 0 | 7 | | | |
| RESIDENCE | 1 | 6 | | | |
| ○ (ADDRESS) | 0 | 6 | | | |
| 1-2-3 | 0 | 5 | | | |
| ACCOUNT NUMBER | 1 | 3 | 3 | 3 | 3 |
| 1 2 3 4 5 6 7 8 | 0 | 3 | | | |
| △○BANK | 1 | 1 | 3 | | 3 |
| VALUE OF PROBABILITY | | | 72 | 9 | 12 |

FIG. 7

METHOD AND APPARATUS FOR DETERMINING FORM SHEET TYPE

BACKGROUND OF THE INVENTION

The present invention relates to a form sheet type determining apparatus used in a cash automatic transaction apparatus or the like, and in particular, to a form sheet type determining method and apparatus for determining a type of a form sheet by reading image data of a form sheet and extracting character strings from the read image data.

Automatic machines such as a cash automatic transaction apparatus and the like automatically process various kind of processes such as automatic payment using an automatic payment utilization application blank, transfer of a public charge using an account transfer blank, or paying-in transaction using an ordinary deposit paying-in blank. At this time, it is necessary for the above-mentioned automatic machines to automatically determine the type of form sheets such as an automatic payment utilization application blank or the like inserted by the user. As the determining method of the form sheet type, the most general method is a method in which identifiable information such as an ID number, bar code information, a mark, etc. indicating the type of form sheet is attached to a location common to each form sheet, and the form sheet type is determined by reading the information.

Furthermore, as a determining method which does not require the above-mentioned attached information, there is known a method for determining the form sheet type by reading a character string or a mark located at a specific position on the form sheet, or a method for determining the form sheet type by reading a position or a shape of a ruled line on the form sheet.

SUMMARY OF THE INVENTION

The method for determining the form sheet type by reading the attached information such as the ID number, bar code information, mark, etc. is an effective method only when the form sheet which is the object is produced anew by laying out, however, this method cannot be applied to determine the form sheet type of already existing form sheets. Furthermore, the method for determining the form sheet type by reading the character, mark, etc. located at the specific position, or the method for determining the form sheet type by reading the position and shape of the ruled line on the form sheet becomes impossible to determine the form sheet type when the layout of the form sheet is changed or the shape of the mark is changed. Moreover, in these methods, there is a fear that the reading of the image becomes unstable due to a printing deviation or a variation of the scanning speed.

The object of the present invention is to solve the above-mentioned problems, and to provide an automatic determining method and apparatus of a form sheet type capable of coping with a variation of the physical layout of the form sheet, and further to provide a computer program product comprising a computer usable medium having a computer readable program for executing such a method.

In order to achieve the object, in a determining method of a form sheet type according to one aspect of the present invention, character strings on an input form sheet are character recognized and extracted as keywords, and these keywords are checked with respect to a matching between a plurality of sets of keywords registered beforehand one set for each form sheet type, thereby to determine the type of the input form sheet.

In a determining method of a form sheet type according to one embodiment of the present invention, image data of an input form sheet is read, character strings are extracted from the read image data, and each of the extracted character strings is character recognized. Then, the keywords constituted by each character string which has been character recognized are respectively collated or checked for matching with sets of keywords registered beforehand, each set including keywords of each type of predetermined form sheets.

Furthermore, in another embodiment of the present invention, image data of a form sheet is read, and at the time of extracting character strings from the read image data, keywords constituted by each character string which has been character recognized are respectively collated or checked for matching with reference character string pattern data stored in a data base, and a character string which has been character recognized and coincides at least partly with any of the reference character string patterns is extracted as each keyword. The reference character string pattern data is used to extract a character recognized character string which contains a character string representing a type of the form sheets. Then, the extracted keywords are collated or checked for matching with keywords intended to determine a specific form sheet type, which keywords being registered in each of the files provided for respective form sheet types, thereby to determine the type of the form sheet.

DESCRIPTION OF THE EMBODIMENTS

Hereinafter, embodiments of the present invention will be described with reference to FIGS. 1 to 5.

Figure 1:
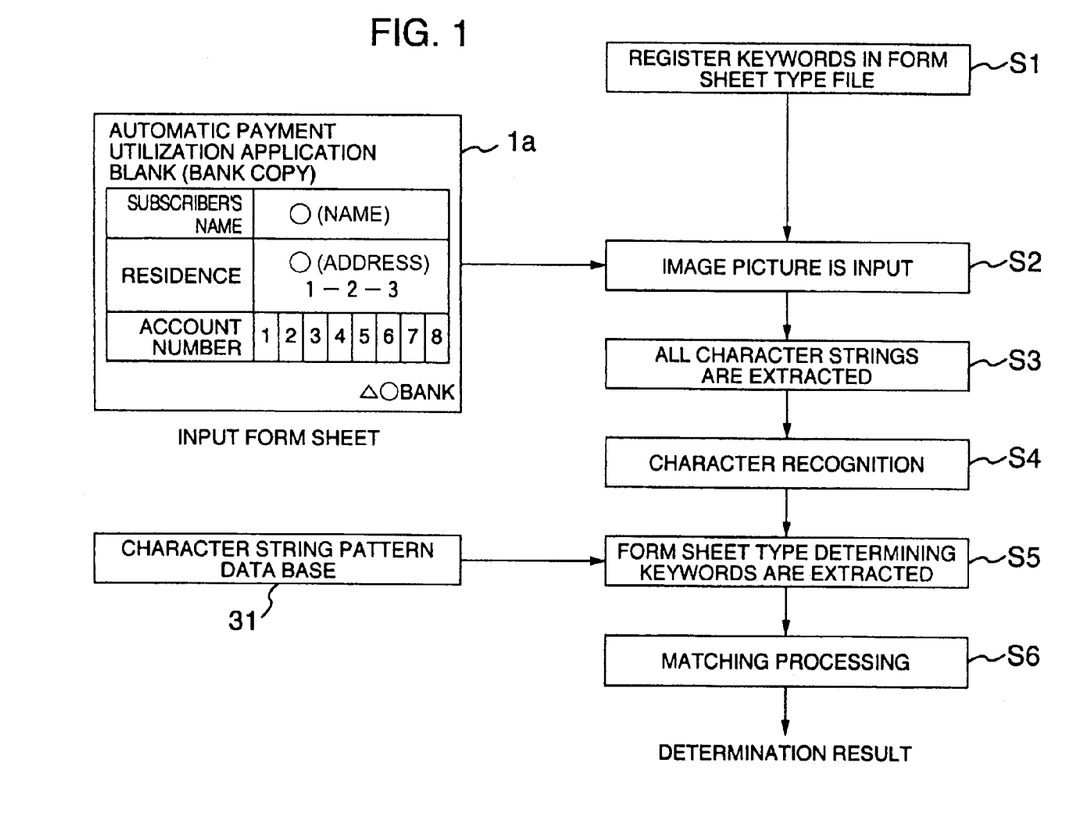
FIG. 1 is a flowchart of an automatic determining method of form sheet type in one embodiment of the present invention.

FIG. 1 is a diagram explaining a processing in an automatic determining apparatus of form sheet type according to the present embodiment. First, in step S1, the keywords for determining form sheet type extracted from each of predetermined form sheets, which are the object of determination of the form sheet type determining apparatus, are registered in a file provided for each of the form sheet types.

Figure 2A:
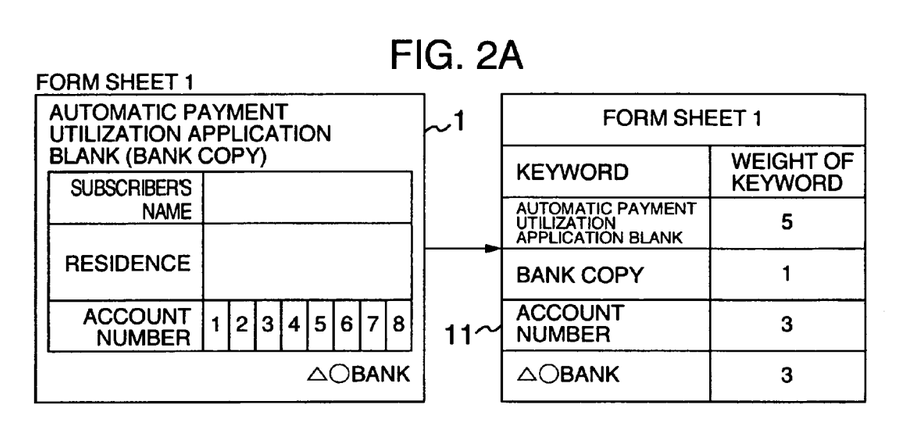
FIGS. 2A–2C are diagrams useful to explain the contents of a form sheet type file.
Figure 2B:
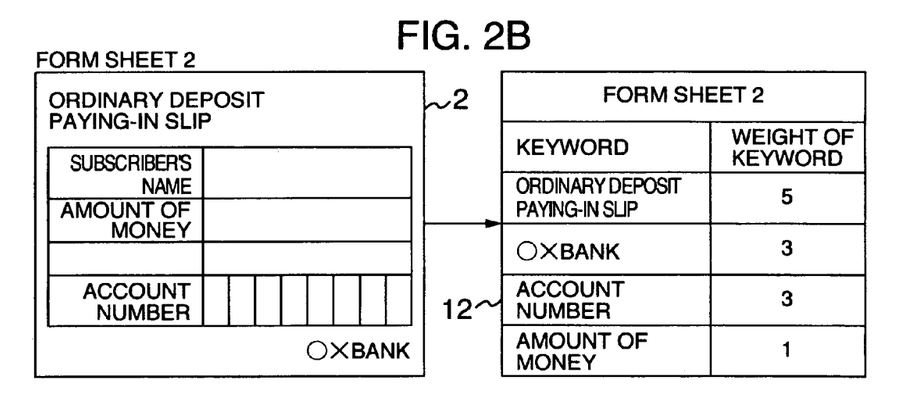
Figure 2C:
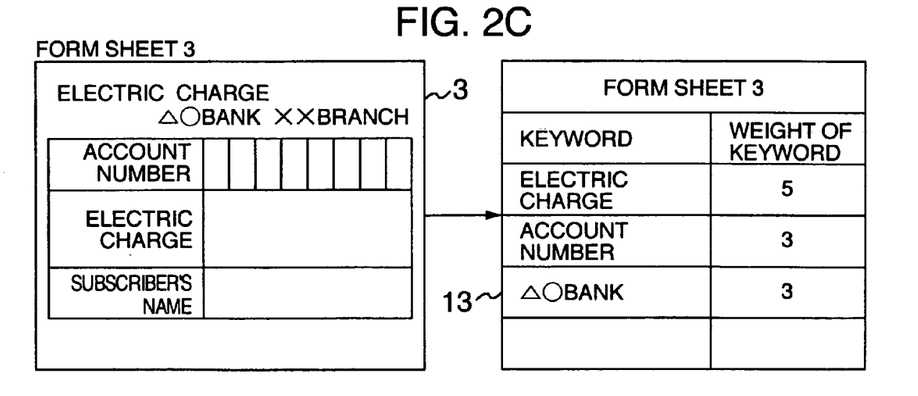

FIGS. 2A–2C are diagrams showing the contents of form sheets which are the object of determination of the form sheet type determining apparatus, and the contents of form sheet type files in which the keywords extracted from the form sheets and used for determining the form sheet type are registered. In FIGS. 2A–2C, reference numerals 1 to 3 show the form sheets, and the form sheet 1 is "an automatic payment blank (bank copy)", the form sheet 2 is "an ordinary deposit paying-in slip", and the form sheet 3 is a payment blank of "electric charge". Also, reference numerals 11 to 13 show form sheet type files respectively corresponding to the form sheets 1 to 3, and each of the form sheet type files includes registered therein a plurality of keywords selected from the form sheets 1 to 3 so that the types of these form sheets can be decided uniquely, and includes registered therein weights respectively given to the keywords according to the degree of importance thereof. The weights are, in other words, ones dependent on the keywords themselves or keyword-specific weights.

For example, the form sheet 1 represents an "automatic payment utilization application blank (bank copy)", and as the keywords, "automatic payment utilization application blank", "bank copy", "account number" and the name of blank "○△ bank" are extracted, and for the respective extracted keywords, the weight values "5", "1", and "3" are given, and the file containing these given weight values together with the keywords are registered as a form sheet type file 11. That is, since the keyword "automatic payment utilization application blank" is most important in determining the form sheet type, the weight value "5" is given.

Next, in step S2, an image picture of a form sheet 1a which is the object of determination of the form sheet type is read. The image picture is desirable to be a binary-coded picture, however, it may be a multi-value-coded picture or a color picture. Also, as a photoelectric conversion means used for reading the picture, a reading means such as a camera, a CCD sensor, etc. may be used.

Next, in step S3, all the character strings in the read image picture are extracted. In extracting the character strings, the information such as a size and a shape of concatenated pixels may be utilized.

Next, in step S4, a character recognition is performed on each of the all character strings extracted from the image picture.

Figure 3:
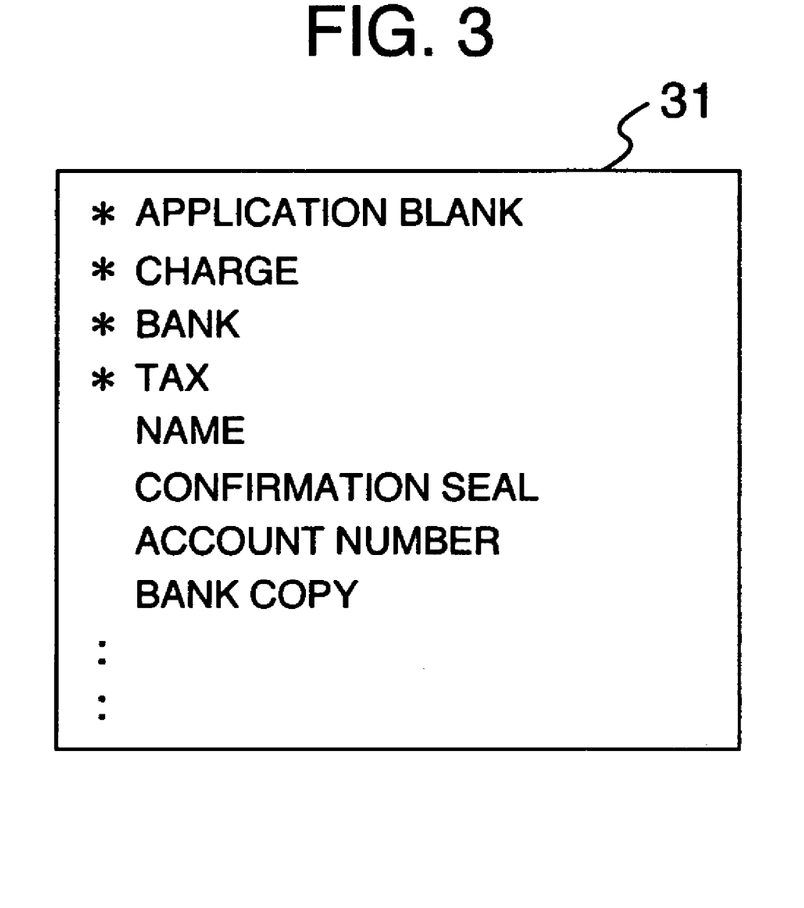
FIG. 3 is a diagram useful to explain the contents of a character pattern data base.

Next, in step S5, the keywords which will be used as keywords for determining the form sheet type are extracted by using a character string pattern data base 31 from the character strings obtained as a result of the character recognition. The form sheet type files 11 to 13 may be stored in this data base 31.

FIG. 3 shows the contents of the character string pattern data base 31. As shown in FIG. 3, character string patterns such as "*application blank", "*charge". "*bank", "*tax", "name", "confirmation seal", "account number", "bank copy", etc. are registered as reference character string patterns. Each of the character strings obtained as a result of the above-mentioned character recognition is collated or checked to determine matching with the character string patterns registered in the character string pattern data base 31, and a character string having at least a part thereof coincident with any of the character string patterns is extracted as a keyword. For example, when the "automatic payment utilization application blank (bank copy)", which is the result of the character recognition, is collated or checked for matching with the character string pattern "*application blank" registered in the character string pattern data base 31, it is possible to extract the "automatic payment utilization application blank" as a keyword. In this respect, the mark * attached to the "*application blank", etc. indicates that all the character strings including the "application blank" as a part thereof are extracted as the keywords.

Next, in matching processing step S6, with respect to the extracted keywords, a weight value for the character type and a weight value for the location are attached, and the keywords attached with these weight values are collated or checked for matching with the keywords having the weight values and registered in the form sheet type files in step S1, and the determination of the form sheet type is carried out after obtaining a probability value.

Figure 4:
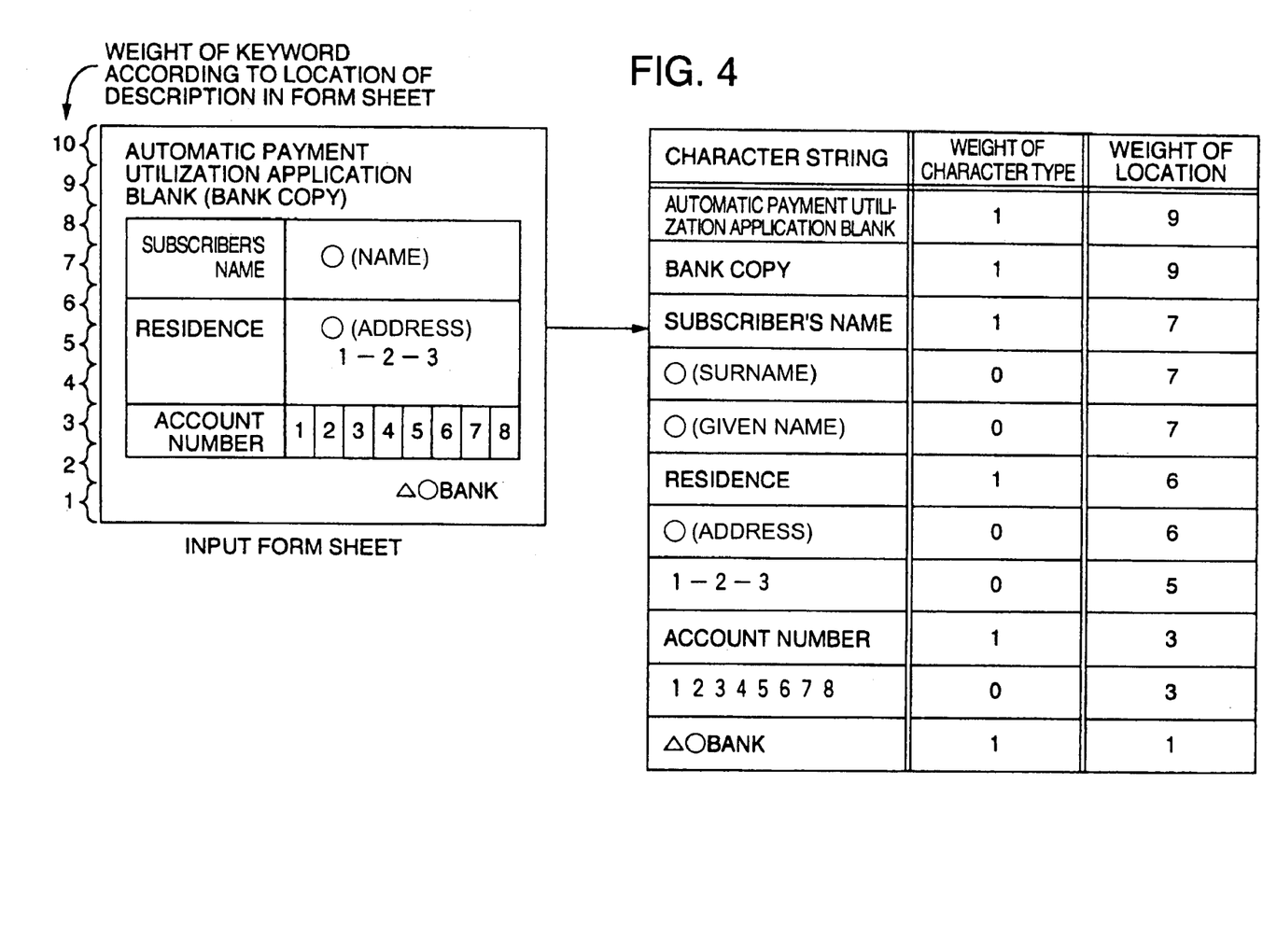
FIG. 4 is a diagram for explaining weight values given to keywords.

In this step S6, first, the weight values are attached to the extracted keywords. FIG. 4 is a diagram for explaining the weight values attached to the keywords. With respect to the extracted keywords, the weight values according to the character type are attached. The character type of a keyword is determined by deciding whether the keyword is a printing type or a handwritten type by detecting the features such as a linearity of the well-known character string and an interval of the characters, and the weighting is performed in accordance with the determined character type. In this embodiment, since it is made a rule to use only the printing type for the form sheet type determination, and not to use the handwritten type, a weight value of 1 is given when it is the printing type, and a weight value of 0 is given when it is the handwritten type.

Furthermore, the weighting is performed in accordance with the described location of the extracted keyword within the form sheet, In this embodiment, as shown in FIG. 4, the form sheet is divided into 10 regions at equal interval in the vertical direction, and the character strings described in the upper potion of the form sheet are regarded as being character strings which characterize the form sheet more than other character strings. Thus, the uppermost region is given a weight value of 10, and following this, weight values 9 to 1 are given depending on the described region of the keyword. In this respect, it is a matter of course that the weights are given to arbitrary locations depending on the object form sheet.

Next, the determination of the form sheet type is performed. In determining the form sheet type, the above-mentioned keywords attached with the weight values of the character type and attached with the weight values of the location are collated with or checked to see a matching with the keywords attached with the weight values and registered in the form sheet type files, and the determination of the form sheet type is performed by obtaining the value of the probability.

In the present embodiment, the value of the probability of the form sheet is obtained by using the following calculation formulas.

K=the weight according to the character type of the extracted keyword
P=the weight according to the described location of the extracted keyword
J=the weight registered in the form sheet type file
the value of probability=K×P×J In the calculation of the value of probability of the form sheet, the value of probability is obtained by the above-mentioned formulas as to all the keywords to be collated, and the total of the obtained values is regarded as the value of probability of the form sheet, and the form sheet having the highest value of probability is determined as the form sheet type of the input picture.

Figure 5:
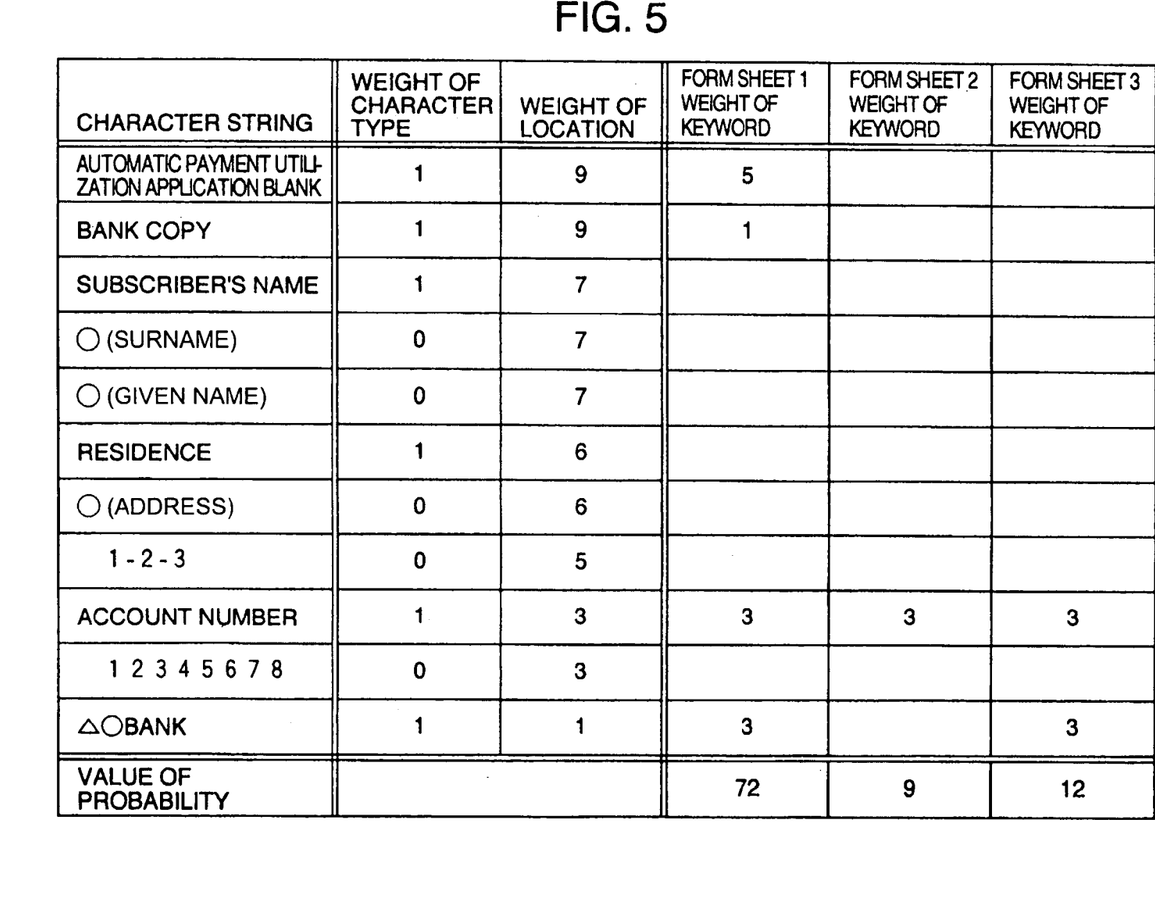
FIG. 5 is a diagram showing an example of calculation of the values of probability of form sheets.

FIG. 5 shows a calculation example of the values of probability of form sheets. In FIG. 5, it is determined that the value of probability that the type of the input form sheet is the form sheet 1, the value of probability that the type of the input form sheet is the form sheet 2, and the value of probability that the type of the input form sheet is the form sheet 3 are respectively 72, 9, and 12, and the value 72 of the form sheet 1 is the largest value. Thus, the form sheet-type of the input picture is determined to be the form sheet 1.

In the above-mentioned embodiment, although the form sheet type determining keywords registered in the form sheet type file in step S1 are collated or checked for matching with the keywords extracted in step S5, in place of or in addition to the keywords extracted in step S5, new keywords produced by combining a plurality of sets of keywords extracted in step S5 nay be used for collation or matching.

Figure 6:
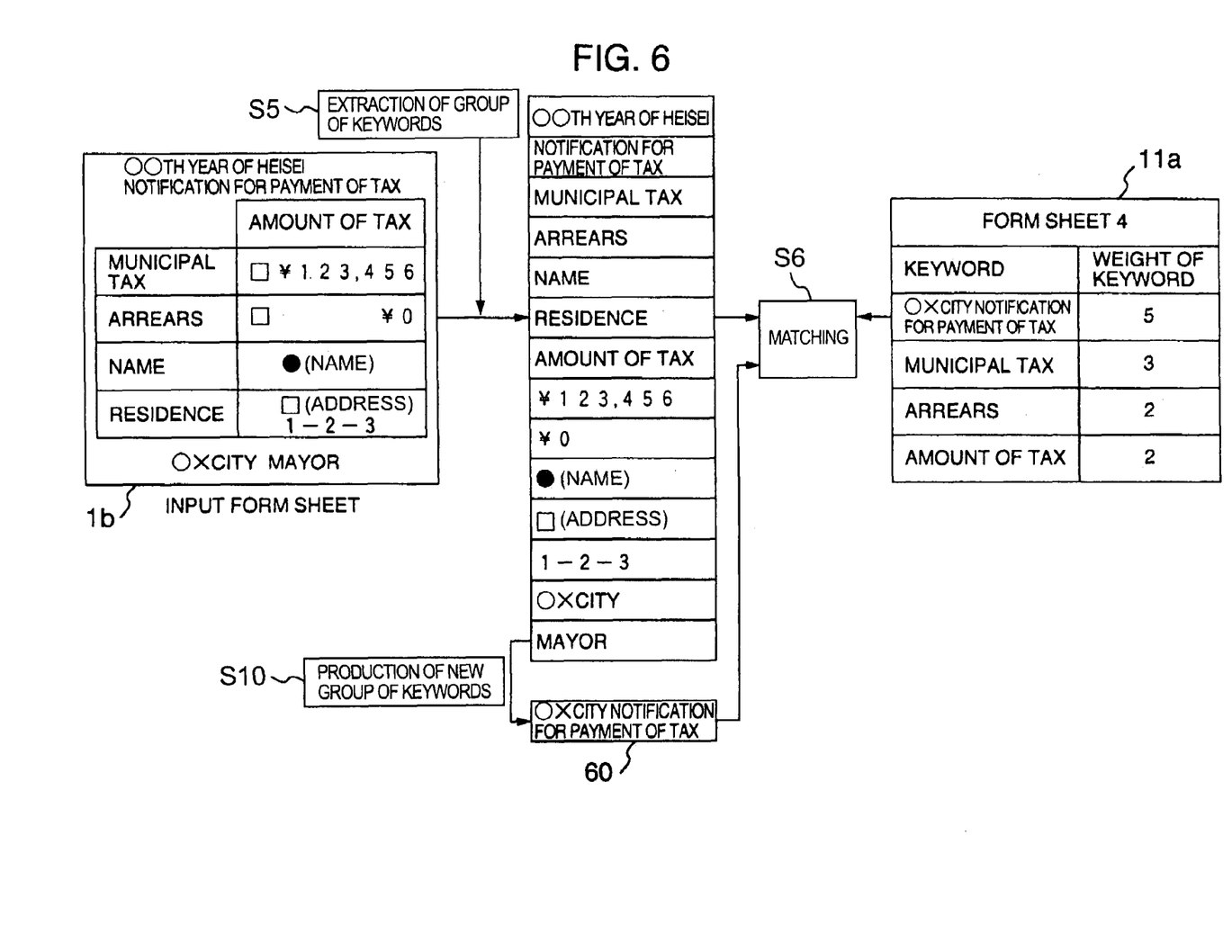
FIG. 6 is a diagram useful to explain a procedure of producing a new keyword by combining extracted keywords.

FIG. 6 shows a procedure for forming new keywords by combining keywords mutually. In FIG. 6, reference numeral 1b denotes a form sheet which is the object of determination, and 11a denotes a form sheet type file. In producing a new keyword, first, keywords "Heisei, ○○th year", "notification for tax payment", . . . , "○X city" and "mayor" are extracted from the form sheet 1b which is the determination object (step S5). Then, the extracted keywords "Heisei, ○○th year", notification for tax payment", . . . , "○X city" and "mayor" are combined, and for example, a new keyword "○X city notification for payment of tax" 60 is produced (step S10). Then, this new keyword is collated or checked for matching with the form sheet type determining keyword registered in the form sheet type file 11a (step S6), thereby to determine the form sheet type of the form sheet 1b. In this respect, the step S10 may be performed between step S5 and step S6 in FIG. 1, or may be included in step S5.

Figure 7:
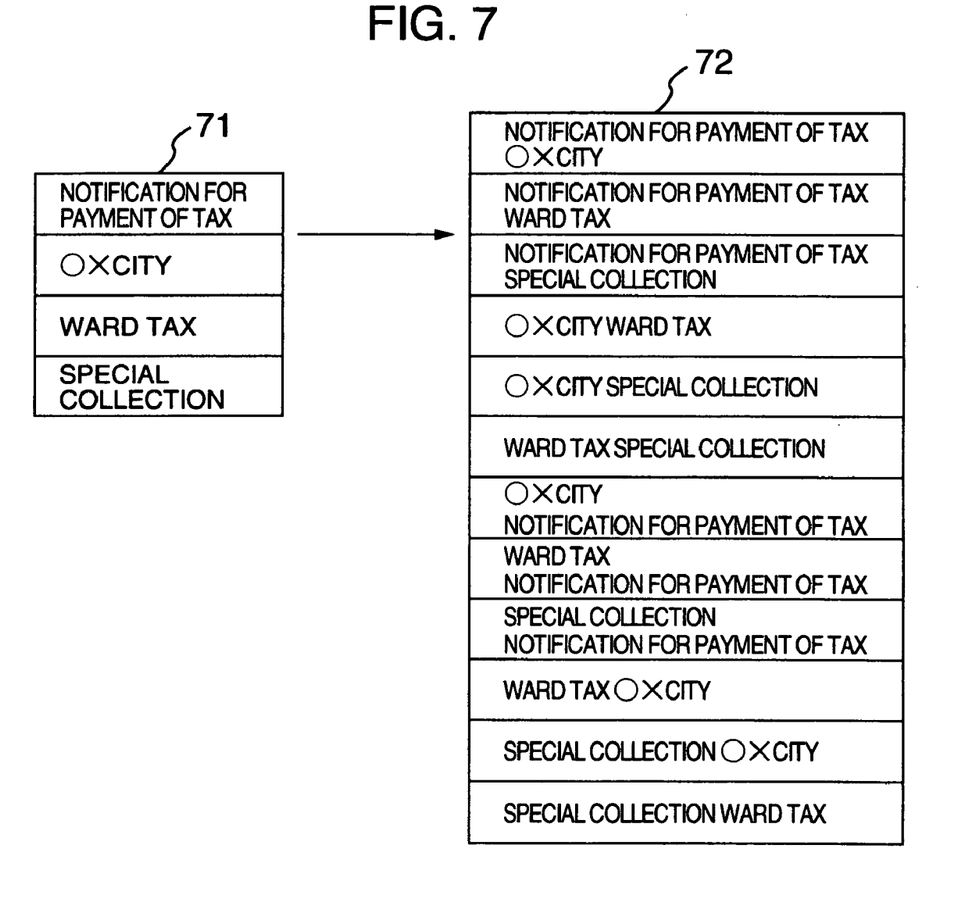
FIG. 7 is a diagram showing a concrete example of producing new keywords.

FIG. 7 illustrates a method of forming new keywords. In FIG. 7, the reference numeral 71 denotes a group of keywords each extracted in step S5. A new keyword is formed by combining two or a plurality of keywords from the group of keywords 71. In this case, each keyword of the group of keywords 71 is combined with another in all manners of combination to form a new keyword, and as a result, a group of new keywords 72 are produced.

Figure 8:
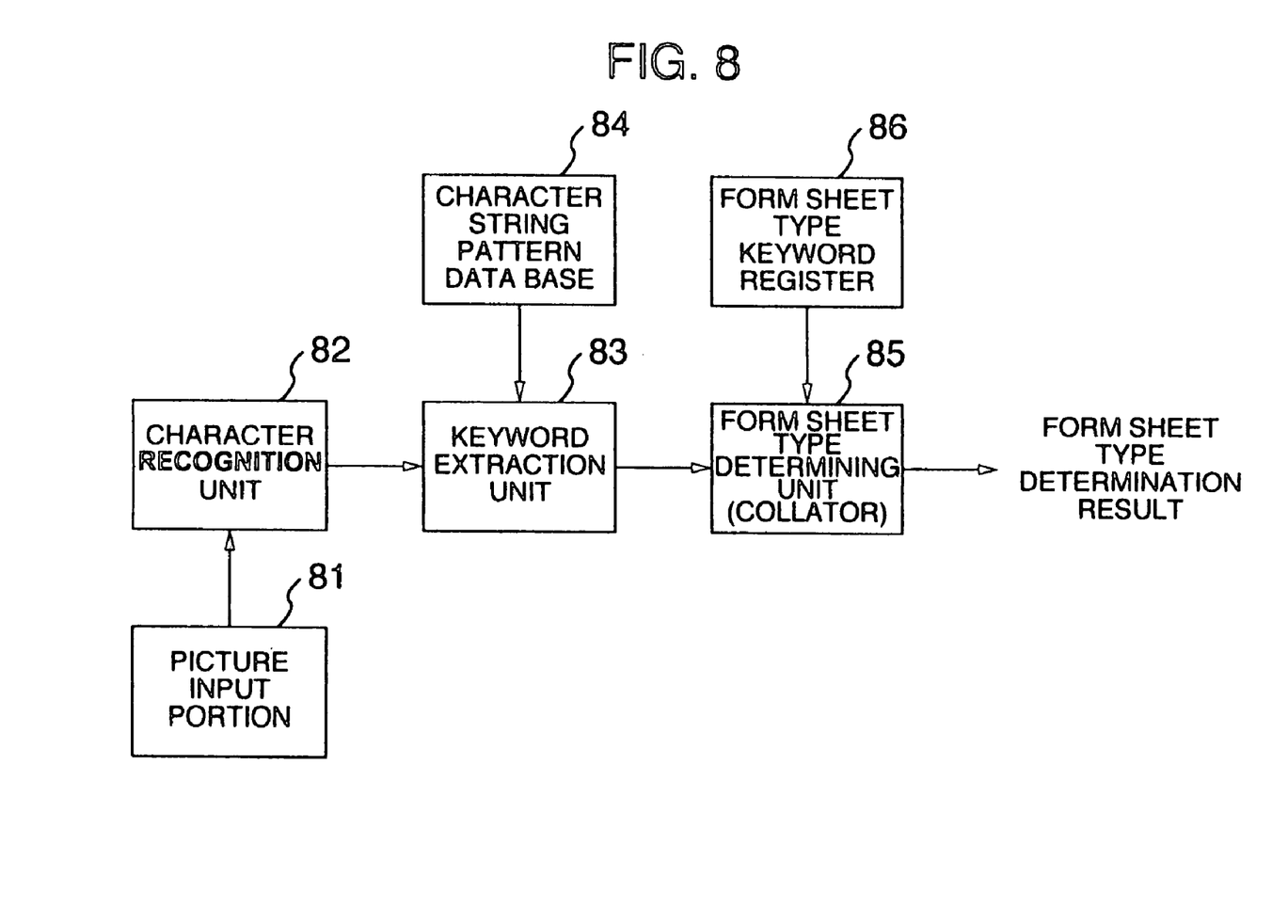
FIG. 8 is a diagram showing a structure of an automatic determining apparatus of form sheet type in another embodiment of the present invention.

FIG. 8 is a block diagram showing a structure of a form sheet type determining apparatus in another embodiment of the present invention.

In FIG. 8, a picture input portion 81 reads an image picture of a form sheet which is the determining object of the form sheet type determining apparatus. As a photoelectric conversion means used for the picture reading, a camera, a CCD sensor, and the like may be used.

A character recognition unit 82 extracts character strings from the input image picture, and performs character recognition of the extracted character strings.

A keyword extraction unit 83 extracts keywords useful for form sheet type determination from the character strings obtained as a result of the character recognition.

A form sheet type determining unit (collator) 85 collates for each form sheet type file, the extracted keywords with each keyword registered beforehand in the form sheet type files 11 to 13 (FIG. 2) stored in a form sheet type keyword register 86, thereby to determine the type of the form sheet.

Since the operation of the form sheet type determining apparatus of the present embodiment is as described in the foregoing, the detailed explanation will be omitted here.

There will be no need to mention that the present invention can be implemented as a computer usable recording medium which realizes a computer readable program code means or sequences of instructions in order to execute the form sheet type determination method described in the foregoing.

As described above, according to the above-mentioned embodiments, since the form sheets are identified by automatically extracting character strings respectively located at arbitrary positions and subsequently performing character recognition to determine the form sheet type, and by collating or checking for a matching with a group of keywords described in form sheet type information, at least the following advantageous effects can be obtained.

It is possible to determine the form sheet type without adding new information such as a bar code, an ID number, etc. to the form sheet.

It is possible to determine the form sheet type even when the form sheet layout is changed, or the font of the form sheet is changed.

It is possible to determine the form sheet type even when a printing deviation is caused in the form sheet.

It is possible to easily register the feature information used to determine the form sheet. Furthermore, it is possible to reduce the storage area for storing the feature information at the time of form sheet determination.

Since the character strings at arbitrary positions within the form sheet are used, the degree of freedom for performing the form sheet type determination becomes high, and at the same time, it is possible to increase the types of the form sheets which can be determined.

It is possible to provide an automatic determining apparatus of form sheet type which can be adapted to a variation of physical layout of the form sheets.

In view of the teachings described above, it is apparent that the present invention can be modified and changed in various ways. Therefore, such modifications and changes belong to the present invention without departing from the scope of the present invention. For example, the form sheet type keyword register 86 may be formed as a part of the data base 31.

What is claimed is:

1. A form sheet type determining method comprising the steps of:

extracting each character string on an input form sheet as a keyword, after performing character recognition on the each character string; and collating the extracted keywords with a plurality of sets of keywords registered beforehand for each predetermined form sheet as one set of keywords in a keyword register, thereby to determine the type of said input form sheet, wherein each keyword in each set of keywords registered beforehand is registered in said keyword register in association with a predetermined corresponding weight, and wherein in said step of collating, each of said extracted keywords of said input form sheet is given a weight; the degree of matching between said input form sheet and said predetermined form sheet types is evaluated for each predetermined form sheet type by using said weights of said extracted keywords and said predetermined weights of the keywords in each set of said form sheet types within said keyword register; and one of said predetermined form sheet types having the highest degree of matching is determined to be the type of the input form sheet.

2. A method according to claim 1, wherein said predetermined weight of each keyword of said sets of keywords registered beforehand is a keyword-specific weight.

3. A method according to claim 1, wherein the weights attached to each of said extracted keywords of said input form sheet include at least a weight based on the type of characters forming the keyword and a weight based on the location of the keyword on said input form sheet.

4. A form sheet type determining method for determining to which of predetermined form sheet types an input form sheet corresponds, comprising the steps of:
registering a plurality of sets of keywords beforehand in a keyword register with one set of keywords for each of predetermined form sheet types;
reading image data of an input form sheet, extracting character strings from the read image data, and performing character recognition on each of the extracted character strings;
extracting each of said character-recognized character strings as a keyword;
collating said extracted keywords, for each of the form sheet types, with said plurality of sets of keywords registered in said register, thereby to determine the type of said input form sheet,
wherein in said keyword register, said each keyword in said sets of keywords is registered in association with a predetermined corresponding weight, and
wherein in said step of collating, each of said extracted keywords of said input form sheet is attached with a weight; the degree of matching between said input form sheet and said predetermined form sheet types is evaluated for each predetermined form sheet type by using said weights of said extracted keywords and said predetermined weights of the keywords in each set of said form sheet types within said keyword register; and one of said predetermined form sheet types having the highest degree of matching is determined to be the type of the input form sheet.

5. A method according to claim 4, wherein the weight attached to each of said extracted keywords of said input form sheet is a weight based on the type of characters forming the keyword.

6. A method according to claim 4, wherein the weight attached to each of said extracted keywords of said input form sheet is a weight based on the location on said input form sheet.

7. A method according to claim 6, wherein the weight attached to each of said extracted keywords of said input form sheet based on the location on said form sheet, is given a larger weight as the location of the keyword on the input form sheet approaches closer to the uppermost location.

8. A method according to claim 4, wherein said predetermined weight of each keyword of said registered set of keywords is a keyword-specific weight.

9. A method according to claim 4, wherein the weights attached to each of said extracted keywords of said input form sheet include a weight based on the type of characters forming the keyword and a weight based on the location of the keyword on said input form sheet.

10. A form sheet type determining apparatus for determining to which of predetermined form sheet types an input form sheet corresponds, comprising:
a keyword register which stores therein a plurality of sets of keywords, one set for each of predetermined form sheet types;
a character recognition unit which reads image data of an input form sheet, extracts character strings from the read image data, and performs character recognition on each character string extracted;
a keyword extraction unit which extracts as a keyword each of the character strings character-recognized by the character recognition unit;
a collator which collates said extracted keywords, for each predetermined form sheet type, with each set of keywords of said plurality of sets of keywords registered in said keyword register to thereby determine the type of said input form sheet,
wherein in said collator each of said extracted keywords is given a weight based on a type of characters constituting the extracted keyword.

11. An apparatus according to claim 10, wherein said type of characters distinguishes whether each of said extracted keywords is typed or handwritten.

12. A form sheet type determining apparatus for determining to which of predetermined form sheet types an input form sheet corresponds, comprising:
a keyword register which stores therein a plurality of sets of keywords one set for each of predetermined form sheet types;
a character recognition unit which reads image data of an input form sheet, extracts character strings from the read image data, and performs character recognition on each character string extracted;
a keyword extraction unit which extracts as a keyword each of the character strings character-recognized by the character recognition unit;
a collator which collates said extracted keywords, for each predetermined form sheet type, with each set of keywords of said plurality of sets of keywords registered in said keyword register to thereby determine the type of said input form sheet,
wherein in said collator each of said extracted keywords is given a weight in accordance with a location of the keyword on said input form sheet.

13. A form sheet type determining apparatus for determining to which of predetermined form sheet types an input form sheet corresponds, comprising:
a keyword register which stores therein a plurality of sets of keywords one set for each of predetermined form sheet types;
a character recognition unit which reads image data of an input form sheet, extracts character strings from the read image data, and performs character recognition on each character string extracted;
a keyword extraction unit which extracts as a keyword each of the character strings character-recognized by the character recognition unit;
a collator which collates said extracted keywords, for each predetermined form sheet type, with each set of keywords of said plurality of sets of keywords registered in said keyword register to thereby determine the type of said input form sheet,
wherein in said register each keyword in each set of keywords is registered in association with a corresponding keyword-specific weight for each form sheet type.

14. A form sheet type determining apparatus for determining to which of predetermined form sheet types an input form sheet corresponds, comprising:
a keyword register which stores therein a plurality of sets of keywords one set for each of predetermined form sheet types;
a character recognition unit which reads image data of an input form sheet, extracts character strings from the read image data, and performs character recognition on each character string extracted;
a keyword extraction unit which extracts as a keyword each of the character strings character-recognized by the character recognition unit;

a collator which collates said extracted keywords, for each predetermined form sheet type, with each set of keywords of said plurality of sets of keywords registered in said keyword register to thereby determine the type of said input form sheet, wherein in said register each keyword in each set of keywords is registered in association with a predetermined weight, and wherein in said collator, each of said extracted keywords is attached with a weight, and said collator evaluates, for each form sheet type, the degree of matching between said input form sheet and said predetermined form sheet types by using said weights of said extracted keywords and said predetermined weight of each keyword in each set of said keywords within said keyword register to thereby decide that a form sheet type having a highest degree of matching is the form sheet type of said input form sheet.

15. An apparatus according to claim 14, wherein the weight given to each of said extracted keywords is a weight based on a type of characters constituting the keyword.

16. An apparatus according to claim 15, wherein said type of characters distinguishes whether each said extracted keywords is typed or handwritten.

17. An apparatus according to claim 16, wherein each of said extracted keywords is given a weight larger than 0 when the keyword is typed, and given a weight of 0 when the keyword is handwritten, such that among said extracted keywords of said input form sheet, one or more handwritten keywords are eliminated from the determination of the form sheet type.

18. An apparatus according to claim 16, wherein the weight attached to each of said extracted keywords of said input form sheet is given a larger weight as the location of the keyword on the input form sheet approaches closer to the uppermost location.

19. An apparatus according to claim 14, wherein the weight given to each of said extracted keywords is a weight based on a location of the keyword on said input form sheet.

20. An apparatus according to claim 14, wherein said predetermined weight of each keyword in each set of keywords registered in said register is a keyword-specific weight.

21. An apparatus according to claim 14, wherein the weights attached to each of said extracted keywords of said input form sheet include a weight based on the type of characters forming the keyword and a weight based on the location of the keyword on said input form sheet.

22. A computer program product comprising:

a computer usable medium having computer readable program code means embodied in said medium for determining whether an input form sheet is one of predetermined form sheet types, said computer readable program code means comprising:

means for registering a plurality of sets of keywords for each of predetermined form sheet types as a set of keywords beforehand in a keyword register;

means for reading image data of said input form sheet, extracting character strings from the read image data, and performing character recognition on each of the extracted character strings; and collating means for collating, for each form sheet type, said extracted keywords with said sets of keywords registered in said keyword register, thereby to determine the type of said input form sheet, wherein in said register means, each keyword in said sets of keywords is registered in association with a predetermined corresponding weight, and said collating means evaluates, for each form sheet type, the degree of matching between said input form sheet and said predetermined form sheet types by using the weights given to each of said extracted keywords and said predetermined weights of the keywords in each set of said keywords within said keyword register to thereby decide that a form sheet type having a highest degree of matching is the form sheet type of said input form sheet.

* * * * *